United States Patent
Shishido et al.

(10) Patent No.: US 7,303,730 B2
(45) Date of Patent: Dec. 4, 2007

(54) WASTE GAS TREATING DEVICE HAVING FLOW REGULATOR

(75) Inventors: Satoru Shishido, Hiroshima (JP); Takao Asami, Hiroshima (JP); Masato Mukai, Hiroshima (JP); Katsuhiro Yashio, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 695 days.

(21) Appl. No.: 10/333,851

(22) PCT Filed: Jul. 27, 2001

(86) PCT No.: PCT/JP01/06490

§ 371 (c)(1),
(2), (4) Date: Apr. 19, 2003

(87) PCT Pub. No.: WO02/11865

PCT Pub. Date: Feb. 14, 2002

(65) Prior Publication Data

US 2003/0152498 A1    Aug. 14, 2003

(30) Foreign Application Priority Data

Aug. 3, 2000    (JP) .............................. 2000-235952

(51) Int. Cl.
B01D 50/00 (2006.01)
F24H 9/12 (2006.01)

(52) U.S. Cl. ...................... 422/177; 422/171; 422/176; 422/168; 422/180; 422/181; 422/205; 422/224; 422/228; 138/37; 138/39; 138/40

(58) Field of Classification Search ................ 422/168, 422/169, 170, 177; 209/718; 55/397; 96/64; 138/37

See application file for complete search history.

(56) References Cited

U.S. PATENT DOCUMENTS 4,213,766 A * 7/1980 Wyatt .............................. 95/78
5,043,146 A * 8/1991 Ishikawa et al. ............ 422/176

* cited by examiner

*Primary Examiner*—Glenn Caldarola
*Assistant Examiner*—Kaity Handal
(74) *Attorney, Agent, or Firm*—Fay Sharpe LLP

(57) ABSTRACT

An apparatus having a baffle device and used for treating an exhaust gas, the apparatus comprising:
(a) an inlet duct through which the exhaust gas is flowed in,
(b) a bend portion, and
(c) a catalyst duct connected to the inlet duct through the bend portion and having a catalyst disposed therein and used for purifying the exhaust gas and,
the baffle device being a baffle lattice having a height of A and disposed at the inlet of the catalyst duct in the direction of the cross section of the catalyst duct,
wherein the baffle lattice is provided, for supporting the lattice, with an outer frame having a height of B and disposed so that the upper ends of the outer frame become the same level with the upper ends of the baffle lattice; the outer frame is provided, on its lower ends for supporting the frame, with beams; and the relation between the height A and the height B satisfies the following equation:

A<B, in which apparatus, occurrence of channeling (nonuniform flow distribution) of an exhaust gas at the inlet of a catalyst layer can be prevented.

10 Claims, 4 Drawing Sheets

Prior Art

WASTE GAS TREATING DEVICE HAVING FLOW REGULATOR

TECHNICAL FIELD

The present invention relates to an apparatus having a baffle device and used for treating an exhaust gas. More specifically, the present invention relates to an apparatus having a baffle lattice at the inlet of a catalyst device to improve the distribution of the flow rates of an exhaust gas in the catalyst device, and used for treating an exhaust gas, especially for denitrating an exhaust gas.

BACKGROUND ART

Heretofore, in large-sized boilers for thermal power plants, a large apparatus for treating an exhaust gas, such as a denitrating apparatus is installed. FIG. 7 is an illustration of a structure of a device in the vicinity of a denitrating device installed in a duct used for an exhaust gas generated from such a combustion apparatus as described above, including an enlarged illustration of a part of the device. This apparatus comprises inlet duct 1 through which exhaust gas G is flowed in, catalyst duct 9 in which denitrating catalyst layer 4 is disposed, bend portion 2 which connects the inlet duct 1 and the catalyst duct 9, baffle lattice 3 disposed at the inlet of the catalyst duct 9 in the direction of the cross section of the duct, and beams 6 which directly support the baffle lattice 3. In this apparatus, exhaust gas G reaches, through inlet duct 1, to bend portion 2 formed at a midway of an exhaust gas duct, changes there its flow direction by 90°, flows into catalyst layer 4 disposed in catalyst duct 9 through baffle lattice 3, and then reaches to outlet duct 5 after subjected to a denitration. In the FIG. 7, the distribution of gas flow rates at the inlet of catalyst layer 4 is shown, and the distribution indicates that the flow rates of an exhaust gas are nonuniform in the direction of the cross section of the catalyst duct 9. Accordingly, it has been strongly desired or requested that (i) an exhaust gas flows into catalyst layer 4 as uniformly as possible and (ii) the flow of an exhaust gas which moves into catalyst layer 4 and the flow of the exhaust gas in the catalyst layer 4 become the same as much as possible, namely, the pattern of the flow passages of an exhaust gas immediately prior to flowing into catalyst layer 4 agrees with the pattern of the flow passages formed in the catalyst layer 4 for the exhaust gas. These desires are produced based on the following reasons:

That is, (i) the reason why the flowing of an exhaust gas into catalyst layer 4 is desired to be as uniform as possible is to efficiently increase the area in which the exhaust gas contacts with the catalyst in the catalyst layer 4. If the flowing of the exhaust gas into the catalyst layer was not uniform, specific portions of the catalyst in the catalyst layer 4 contact with a large amount of the exhaust gas and thus the performances of the catalyst decrease as a whole. Besides, there exists such a problem as the portions of the catalyst which contact with a large amount of the exhaust gas remarkably deteriorate and thus the life of the catalyst becomes short.

Next, (ii) the reason why the flow of an exhaust gas moving into catalyst layer 4 is desired to agree with the flow of the exhaust gas in the catalyst layer 4 as much as possible is that, for instance, when dusts such as fly ashes and unburnt matters are contained in the exhaust gas, the exhaust gas sometimes obliquely flows into flow passages formed among catalysts (catalyst plates) in the catalyst layer for the exhaust gas, and thus (a) the dusts directly collide against the catalyst plates to wear their surfaces and (b) the dusts adhere to and deposit on the front portions of the catalyst plates to impede the flow of the succeeding exhaust gas into the flow passages.

In order to resolve the problems described in (i) and (ii) above, a method in which baffle lattice 3 is disposed at the inlet of a catalyst duct (Japanese Patent No. 2637119) and another method in which a baffle device having baffle plates formed both at the upper stream side (on the upper flange) and the down stream side (on the lower flange) of a beam is provided at the inlet of a reactor (Laid open Japanese Utility Model Publication No. Sho 59-102134) are proposed.

DISCLOSURE OF THE INVENTION

In the former method described above, baffle lattice 3 is disposed at the inlet of catalyst duct 9 (catalyst duct 10 in Japanese Patent No. 2637119), the baffle lattice 3 is provided with an outer frame having the same height as that of the baffle lattice, and further, beams 6 used for directly supporting the baffle lattice 3 and for preventing the reactor from being deformed are disposed so that the lower ends of plates of the baffle lattice 3 contact with the upper surfaces of upper flanges of the beams 6 as shown in the enlarged portion of FIG. 7. In this structure, however, the beams 6 used for directly supporting the baffle lattice partially block the exhaust gas flow passages in the baffle lattice 3. Besides, the cross sectional area in the direction perpendicular to the flow direction of an exhaust gas in inlet duct 1 decreases in the bend portion 2. As the result, the exhaust gas which was originally expected to flow through the flow passages blocked with the beams 6 used for directly supporting the baffle lattice flows into flow passages positioned at the side of inlet duct 1 of the beams 6 to produce local high gas flow rate regions on the catalyst layer (see the distribution of gas flow rates in FIG. 7). On the other hand, in the method in which the baffle device having baffle plates both on the upper flange and lower flange of the beam is disposed at the inlet of a reactor, baffle effect is insufficient.

Subject of the present invention is to provide a structure of a baffle device for preventing occurrence of a channelling (nonuniform flow) of an exhaust gas to be flowed into a catalyst duct in an apparatus which is used for treating the exhaust gas and comprises an inlet duct through which the exhaust gas is flowed in, a bend portion, and a catalyst duct connected to the inlet duct through the bend portion and having a catalyst disposed in the duct and used for purifying the exhaust gas, and which apparatus further has a baffle lattice disposed at the inlet of the catalyst duct in the direction of the cross section of the duct.

In order to achieve the subject described above, the present invention is summarized as follows:

(1) An apparatus having a baffle device and used for treating an exhaust gas, the apparatus comprising:

(a) an inlet duct through which the exhaust gas is flowed in, (b) a bend portion, and (c) a catalyst duct connected to the inlet duct through the bend portion and having a catalyst disposed therein and used for purifying the exhaust gas, and the baffle device being a baffle lattice having a height of A and disposed at the inlet of the catalyst duct in the direction of the cross section of the catalyst duct, wherein the baffle lattice is provided, for supporting the lattice, with an outer frame having a height of B and disposed so that the upper ends of the outer frame become the same level with the upper ends of the baffle lattice; the outer frame is provided, on its lower ends for supporting the frame by turn, with beams disposed in parallel to rectangular plates forming the baffle lattice; and the relation between the height A and the height B satisfies the following equation.

$$A<B$$

(2) The apparatus for treating an exhaust gas recited in paragraph (1) above wherein baffle plates comprising a pair of flat plates are provided in counter relationship both on the upper surfaces of upper flanges and the lower surfaces of lower flanges of the beams used for supporting the baffle lattice so that the angle α formed between the surfaces of the baffle plates and the upper or lower surfaces of the upper or lower flanges of the beams satisfies the following equation.

$$0°<\alpha<90°$$

(3) The apparatus for treating an exhaust gas recited in paragraph (1) above wherein baffle plates comprising a pair of flat plates are provided in counter relationship only on the upper surfaces of upper flanges or the lower surfaces of lower flanges of the beams used for supporting the baffle lattice so that the angle α formed between the surfaces of the baffle plates and the upper or lower surfaces of the upper or lower flanges of the beams satisfies the following equation.

$$0°<\alpha<90°$$

In the apparatus of the present invention used for treating an exhaust gas, the shape of a baffle lattice provided in a catalyst duct having a catalyst layer disposed therein may be a lattice-like, honeycomb-like, or any other shape so far as the baffle lattice is arranged at the inlet of the catalyst duct in the direction of the cross section of the catalyst duct. Further, the catalyst used for the catalyst layer 4 disposed in the catalyst duct 6 in the apparatus of the present invention is not limited to a denitrating catalyst, and it may be a catalyst used for treating an exhaust gas containing hazardous halogen compounds such as dioxins, or another catalyst.

Figure 1:
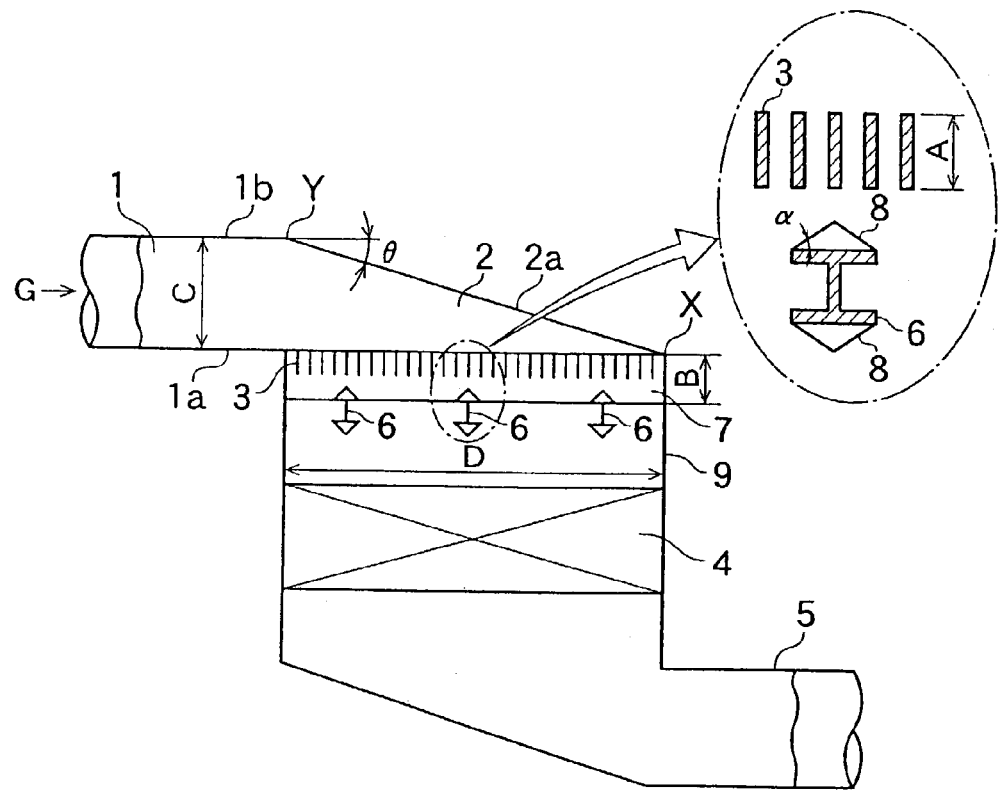
FIG. 1 is an illustration showing the structure of a device in the vicinity of a denitrating device in an example of exhaust gas treating apparatuses of the present invention, including an enlarged illustration of a part of the device.

Explanation of symbols: Meanings of symbols in the drawings are as follows:

1 . . . inlet duct, 2 . . . bend portion, 3 . . . baffle lattice, 4 . . . catalyst layer, 5 . . . outlet duct, 6 . . . beams for supporting the outer frame of a baffle lattice, 7 . . . outer frame of a baffle lattice, 8 . . . baffle plates, 9 . . . catalyst duct, and G . . . exhaust gas.

BEST MODE FOR CARRYING OUT THE INVENTION

Now, the present invention will be described in more detail with reference to examples shown in the drawings. However, it should be understood that the scope of the present invention is by no means limited by such specific examples.

FIG. 1 is an illustration showing the structure of a device in the vicinity of a denitrating device in an example of exhaust gas treating apparatuses of the present invention, including an enlarged illustration of a part of the device. This apparatus comprises inlet duct 1 through which exhaust gas G is flowed in, bend portion 2, catalyst duct 9 connected to the inlet duct through the bend portion and having layer 4 of a denitrating catalyst therein, baffle lattice 3 disposed at the inlet of the catalyst duct 9 in the direction of the cross section of the duct and having a height of A, outer frame 7 used for supporting the baffle lattice and having a height B which is larger than the height A, and beams 6 disposed in parallel to the rectangular plates, which plates form the baffle lattice, and used for supporting by turn the outer frame 7 provided to the lower ends of the outer frame.

Catalyst duct 9 having catalyst layer 4 disposed therein is arranged so that the direction of the catalyst duct and that of inlet duct 1 intersect with each other at right angles, and both of the ducts are connected through bend portion 2 to form a structure. Then, outer casing 2a of the bend portion is formed such that intersecting point X of the extremity of the bend portion with the extension line of floor (bottom) surface 1a of the inlet duct 1 is connected through a straight line to intersecting point Y of extension line of the wall surface at the inlet duct side of the catalyst duct with ceiling portion 1b of inlet duct 1. The inclination of outer casing 2a which means the angle θ formed between the extension line of the ceiling portion 1b of the inlet duct 1 and the outer casing 2a of the bend portion is expressed by the following equation:

$$\theta = \tan^{-1}(C/D)$$

wherein C is the width (or diameter) of inlet duct 1 and D is the width (or diameter) of catalyst duct 9.

Figure 2:
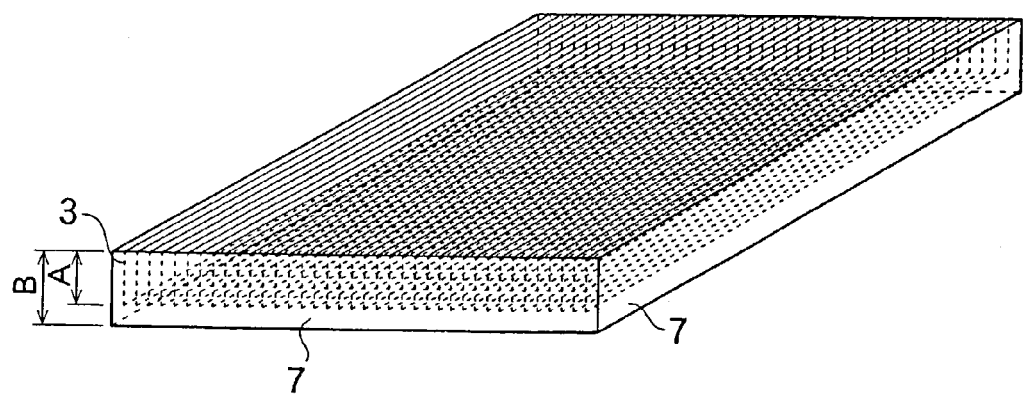
FIG. 2 is a perspective view of the outer frame of the baffle lattice used in the apparatus shown in FIG. 1.

Baffle lattice 3 is arranged so that the level of its upper ends become about the same with the level of floor surface 1a of the inlet duct at the inlet portion of catalyst duct 9. In the baffle lattice 3, rectangular plates having a height of A are arranged in parallel with each other as shown in the Figures, and outer frame 7 having a height of B is provided outside the baffle lattice 3. The outer frame 7 of the baffle lattice is arranged so that the level of upper ends of the frame become about the same with the upper ends of baffle lattice 3, and the outer frame is designed so that the height B of the frame is larger than the height A of baffle lattice 3 as shown in FIG. 2.

Beams 6 used for supporting the outer frame of the baffle lattice are arranged so that the level of the lower ends of outer frame 7 become the same with that of the upper surfaces of upper flanges of the beams 6, and the beams and frames form a structure in which the beams are arranged in parallel to the rectangular plates of the baffle lattice, and support the outer frame 7 of the lattice. On the upper surfaces of upper flanges and lower surfaces of lower flanges of beams 6 used for supporting the outer frame of the baffle lattice, a couple of baffle plates 8 each having an elevation angle of α are provided over the entire length of extending beams excluding the portions where flanges of beams 6 contact with the outer frame 7. The angle α of the baffle plates is in the range which satisfies the equation $$0° < \alpha < 90°.$$

Figure 3:
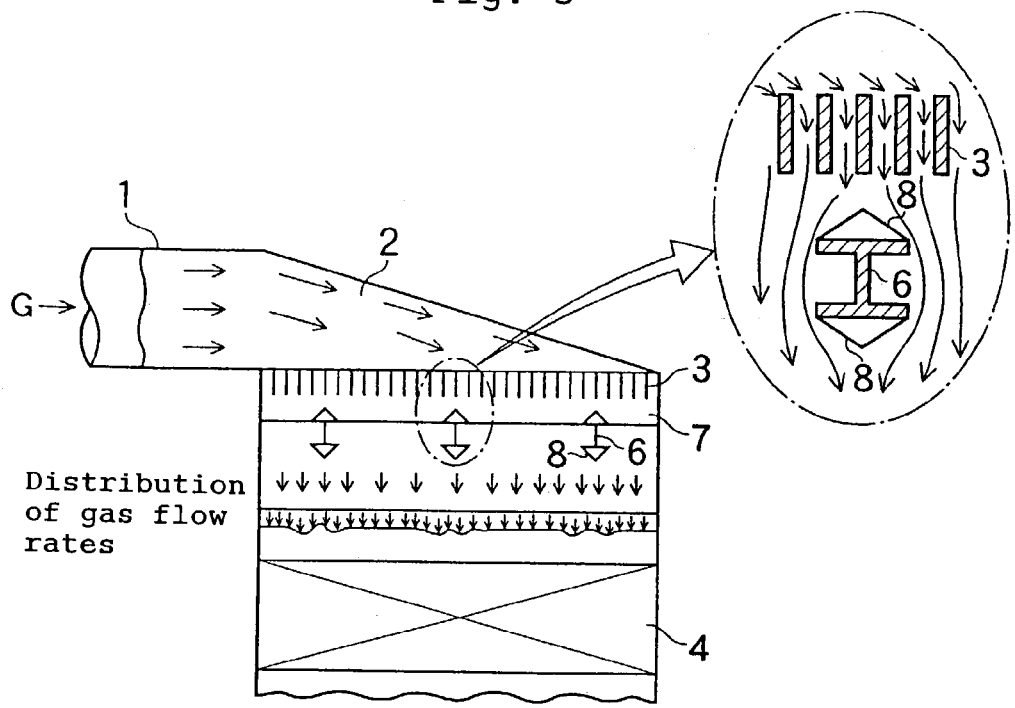
FIG. 3 is an illustration similar to that in FIG. 1 and additionally shows the state of the flow rate distribution of an exhaust gas in the apparatus shown in FIG. 1.

In FIG. 3, the flow state of an exhaust gas in an apparatus of the present invention having the structure as described above is shown.

Figure 7:
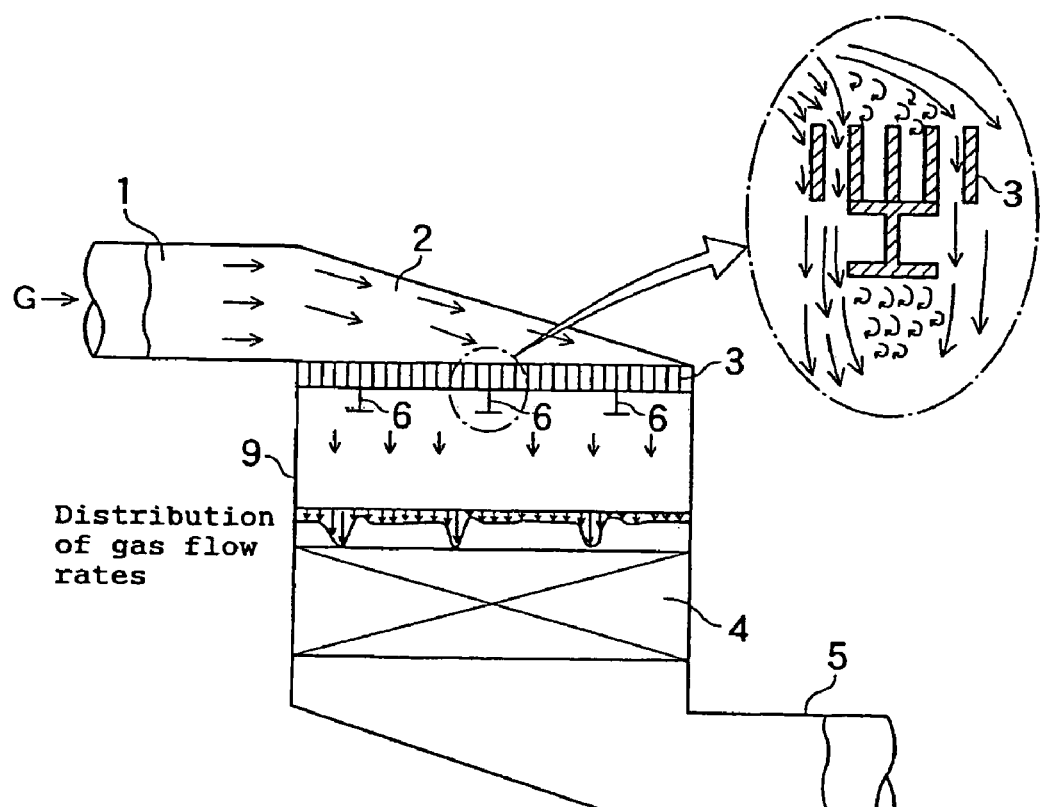
FIG. 7 is an illustration showing the structure of a device in the vicinity of a denitrating device in a conventional exhaust gas treating apparatus, including an enlarged illustration of a part of the device.

Next, when an exhaust gas was flowed in the apparatus (as shown in FIG. 3) having the structure described above and in a conventional apparatus (as shown in FIG. 7), and the states of the gas flow were observed, respectively, the following facts were found:

1) In the conventional apparatus (FIG. 7), flow passages between some of the plates in a baffle lattice are blocked by upper flanges of beams 6 used for directly supporting the baffle lattice since no space exists between the lower ends of the plates and the upper surfaces of the upper flanges, and thus, the exhaust gas which was originally expected to flow into the blocked passages additionally flows into the passages positioned at the inlet duct side of the blocked passages. As the result, in the conventional apparatus, regions where gas flow rates are high are locally produced at the inlet of a catalyst layer.

2) On the other hand, in an apparatus of the present invention (FIG. 3), an exhaust gas flows through a baffle lattice without being blocked since spaces exist between the lower ends of baffle lattice 3 and the upper surfaces of the upper flanges of beams 6 which supports the outer frame which supports by turn baffle lattice 3. Further, particularly when baffle plates 8 are provided on the upper surfaces of the upper flanges and the lower surfaces of the lower flanges of the beams 6, bad influences of the beams 6 used for supporting the outer frame of the baffle lattice are moderated. Thus, a very uniform flow distribution of an exhaust gas can be obtained according to the present invention.

Figure 4:
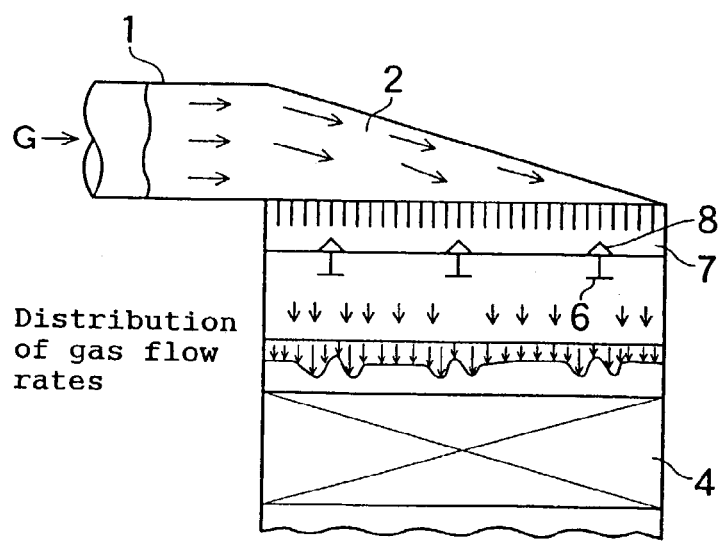
FIG. 4 is an illustration similar to that in FIG. 3 with the exception that baffle plates are provided only on the upper side (on the upper surfaces of upper flanges) of the beams used for supporting the outer frame of the baffle lattice.
Figure 5:
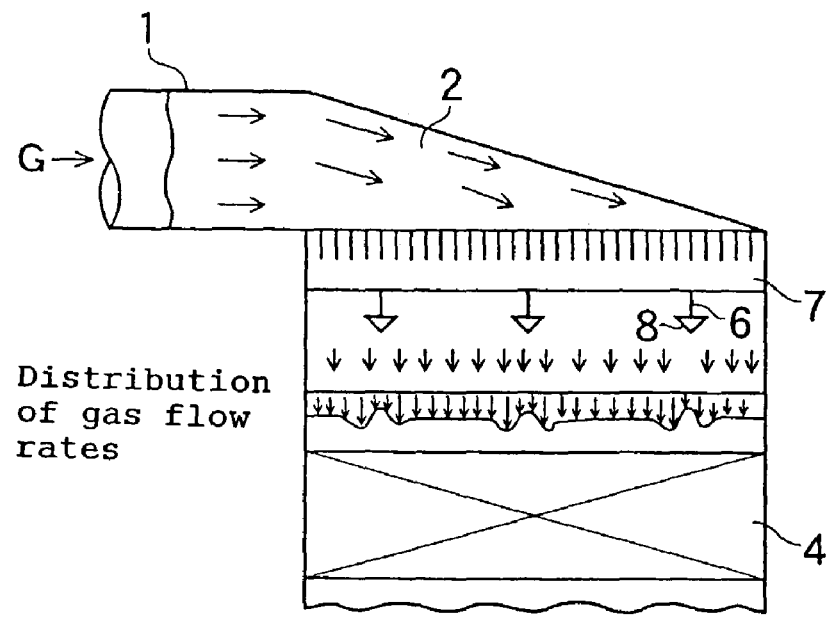
FIG. 5 is an illustration similar to that in FIG. 3 with the exception that baffle plates are provided only on the lower side (on the lower surfaces of lower flanges) of the beams used for supporting the outer frame of the baffle lattice.
Figure 6:
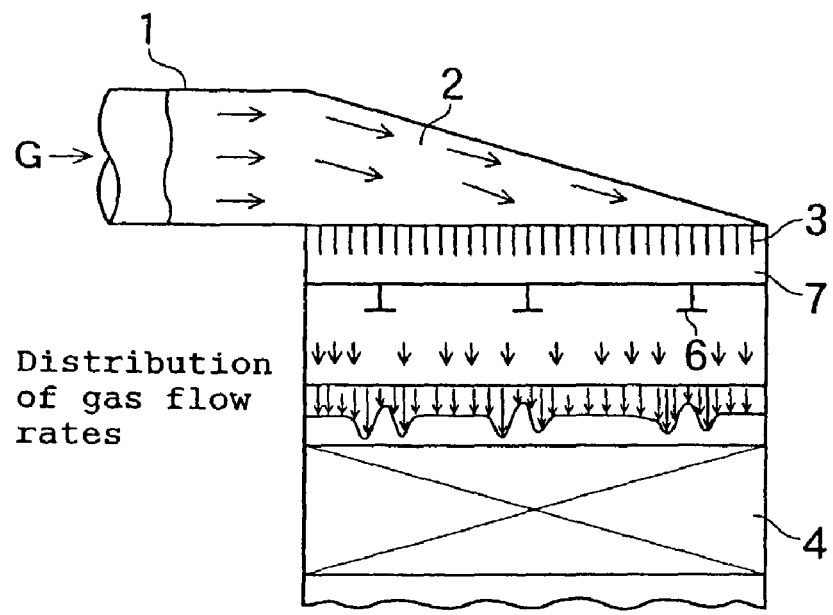
FIG. 6 is an illustration similar to that in FIG. 3 with the exception that no baffle plates are provided to the beams used for supporting the outer frame of the baffle lattice.

In order to evaluate the effects of baffle plates 8 provided on the beams 6 used for supporting the outer frame of the baffle lattice, an exhaust gas was flowed into i) an apparatus (as shown in FIG. 1) in which baffle plates 8 are provided both on the upper surfaces of upper flanges and the lower surface of lower flanges of beams 6 used for supporting the outer frame of the baffle lattice, ii) another apparatus (as shown in FIG. 4) in which baffle plates 8 are provided only on the upper surfaces of upper flanges of the beams 6 used for supporting the outer frame of the baffle lattice, iii) still another apparatus (as shown in FIG. 5) in which baffle plates 8 are provided only on the lower surfaces of lower flanges of beams 6 used for supporting the outer frame of the baffle lattice, and iv) still far another apparatus (as shown in FIG. 6) in which baffle plates are not provided, and the flow states of the exhaust gas were observed, respectively. The results thus obtained are shown in Table 1 in which the results obtained when a conventional apparatus was used are also shown for comparison.

Coefficient of variation (ξ), maximum deviation (ϵ 1), and minimum deviation (ϵ 2) shown in Table 1 are defined the following equations:

$\xi = \sigma/Va \times 100$ (wherein "σ" is a standard deviation and "Va" is an average gas flow rate)

$\epsilon 1 = (max - Va)/Va \times 100$ (wherein "max" is the value of the maximum gas flow rate)

$\epsilon 2 = (min - Va)/Va \times 100$ (wherein "min" is the value of the minimum gas flow rate)

TABLE 1

| Test No. | Test conditions | ξ (%) | ϵ1 (%) ϵ2 (%) |
|---|---|---|---|
| 1 | Conventional technology | 16 | +25 −13 |
| 2 | Baffle plates were provided both to the upper flanges and lower flanges | 8 | +8 −5 |
| 3 | Baffle plates were provided only to the upper flanges | 10 | +10 −13 |
| 4 | Baffle plates were provided only to the lower flanges | 11 | +13 −12 |
| 5 | Baffle plates were not provided | 13 | +17 −13 |

From the test results shown in the Table 1 above, it was confirmed that the ranking of baffle effects in the apparatuses, from highest to lowest, was the apparatus in which baffle plates 8 were provided both to upper flanges and lower flanges of beams 6 used for supporting the outer frame of baffle lattice (FIG. 1), the apparatus in which baffle plates 8 were provided only to the upper flanges of the beams 6 (FIG. 4), the apparatus in which baffle plates 8 were provided only to the lower flanges of the beams 6 (FIG. 5), the apparatus in which baffle plates were not provided (FIG. 6), and the conventional apparatus (FIG. 7).

INDUSTRIAL APPLICABILITY

According to the present invention defined in claim 1 described later, it is possible to prevent the formation of local high gas flow rate regions at the inlet of a catalyst layer caused by the beams which directly support the baffle lattice, and possible to prevent the channeling (nonuniform flow distribution) of an exhaust gas at the inlet of a catalyst layer.

Besides, according to the present invention defined in claim 2 or 3 described later, it is possible to further increase the baffle effects at the inlet of a catalyst layer.

The invention claimed is:

1. An apparatus having a baffle device and used for treating an exhaust gas, the apparatus comprising:
   (a) an inlet duct through which the exhaust gas is flowed in,
   (b) a bend portion, and
   (c) a catalyst duct connected to the inlet duct through the bend portion and having a catalyst disposed therein and used for purifying the exhaust gas, and
   the baffle device being a baffle lattice having a height of A and disposed at the inlet of the catalyst duct in the direction of a cross section of the catalyst duct, wherein the baffle lattice is provided, for supporting the lattice, with an outer frame having a height of B and disposed so that upper ends of the outer frame become the same level with the upper ends of the baffle lattice; the outer frame is provided, on its lower ends for supporting the frame, with beams; and the relation between the height A and the height B satisfies the following equation $$A<B$$

further comprising baffle plates comprising a pair of flat plates are provided in counter relationship both on the upper surfaces of upper flanges and the lower surfaces of lower flanges of the beams used for supporting the outer frame of the baffle lattice so that the angle .alpha. formed between the surfaces of the baffle plates and the upper or lower surfaces of the upper or lower flanges of the beams satisfies the following equation $$0°<\alpha<90°.$$

2. The apparatus for treating an exhaust gas according to claim 1 wherein baffle plates comprising a pair of flat plates are provided in counter relationship only on the upper surfaces of upper flanges or the lower surfaces of lower flanges of the beams used for supporting the outer frame of baffle lattice so that the angle a formed between the surfaces of the baffle plates and the upper or lower surfaces of the upper or lower flanges of the beams satisfies the following equation $$0°<\alpha<90°.$$

3. The apparatus for treating an exhaust gas according to claim 2 wherein the baffle plates provided on the upper surfaces of the upper flanges.

4. The apparatus for treating an exhaust gas according to claim 2 wherein the baffle plates provided on the lower surfaces of the lower flanges.

5. The apparatus of claim 1 wherein an upper end of each beam located below a lower end of the baffle lattice.

6. The apparatus of claim 1 wherein each beam includes a top surface and a length, the length extending away from the lower end of the frame.

7. The apparatus of claim 1 further comprising a space between the lower end of the lattice and each beam.

8. The apparatus of claim 1 wherein the baffle lattice comprises a honeycomb shape.

9. The apparatus of claim 1 wherein the catalyst comprises a compound for treating hazardous halogen compounds.

10. The apparatus of claim 1 wherein the catalyst comprises a denitrating compound.

* * * * *